United States Patent
Bristol

[15] 3,697,495
[45] Oct. 10, 1972

[54] PREPARATION OF POLYVINYL ALCOHOL HAVING IMPROVED COLOR PROPERTIES BY TREATING THE POLYVINYL ESTER WITH OZONE

[72] Inventor: John E. Bristol, Niagara Falls, N.Y.

[73] Assignee: E. I. du Pont de Nemours and Company, Wilmington, Del.

[22] Filed: Aug. 5, 1970

[21] Appl. No.: 61,465

[52] U.S. Cl. ...260/91.3 PV, 260/89.1, 260/91.3 VA, 161/199
[51] Int. Cl. ...............................................C08f 27/16
[58] Field of Search................................260/91.3 PV

[56] References Cited

UNITED STATES PATENTS

| | | | |
|---|---|---|---|
| 2,353,355 | 9/1944 | Stamatoff | 260/32 |
| 2,734,048 | 2/1956 | Bristol et al. | 260/91.3 |
| 2,850,489 | 9/1958 | Turnbull | 260/91.3 |
| 2,862,916 | 12/1958 | Lukman et al. | 260/91.3 |
| 3,033,843 | 5/1962 | Inskip et al. | 260/91.3 |
| 3,153,009 | 10/1964 | Rombach | 260/73 |

FOREIGN PATENTS OR APPLICATIONS

| | | | |
|---|---|---|---|
| 808,108 | 1/1959 | Great Britain | 260/91.3 |

*Primary Examiner*—Joseph L. Schofer
*Assistant Examiner*—Stanford H. Levin
*Attorney*—Ivan G. Szanto

[57] ABSTRACT

Polyvinyl alcohol having improved color properties is prepared in a process in which an alcoholic solution of the polyvinyl ester utilized to prepare the polyvinyl alcohol is treated with ozone prior to the alcoholysis of the polyvinyl ester to the corresponding polyvinyl alcohol.

7 Claims, No Drawings

PREPARATION OF POLYVINYL ALCOHOL HAVING IMPROVED COLOR PROPERTIES BY TREATING THE POLYVINYL ESTER WITH OZONE

BACKGROUND OF THE INVENTION

1. Field of Invention

This invention relates to a process for preparing polyvinyl alcohol having improved color properties.

2. Prior Art

Polyvinyl alcohol is prepared by forming an alcoholic solution of a polyvinyl ester, such as polyvinyl acetate, polyvinyl propionate or polyvinyl butyrate, and subjecting this solution to alcoholysis at temperatures of about 50° C. and higher, with the aid of an alkali metal alcoholate catalyst. This process is described in detail in U.S. Pat. No. 2,734,048. The process described in U.S. Pat. No. 2,734,048 is rapid; however, the polyvinyl alcohol produced may have poor color qualities. That is, polyvinyl alcohol powder produced by the process of U.S. Pat. No. 2,734,048 may have a yellow to tan color rather than the desired white color, and polyvinyl alcohol in the form of thin films cast from aqueous polyvinyl alcohol solutions may have a yellow to tan color rather than being a clear, colorless product.

The presence of color in the polyvinyl alcohol is troublesome in many applications. For example, polyvinyl alcohol is used as a binder in paper-making processes and as a sizing agent in knitting and weaving of various textile products. Polyvinyl alcohol is a particularly desirable textile size as a substitute for starch, since waste fluids from the sizing operation containing starch are pollutants, whereas waste fluids containing polyvinyl alcohol are not pollutants. In paper-making, textile, and similar applications, color-free materials are obviously desirable. Polyvinyl alcohol is also converted into products widely used in film form as a structural component in glass laminates acting to prevent the shattering of glass on impact; in such use, color-free polyvinyl alcohol is essential. Therefore, it is desirable to produce polyvinyl alcohols which will be substantially colorless in solution and when made into films for the various applications discussed above.

The prior art teaches that the color formation in polyvinyl alcohol may be due to reactions of small or trace amounts of impurities which are potential color formers, such as aldehydes or other potential chromophoric atomic groupings, which are present in the polyvinyl alcohol as the result of the alcoholysis of the polyvinyl ester with the aid of alkali metal alcoholate catalyst. It is also thought that unsaturated groups found in the alcoholic solutions of the polyvinyl esters subjected to alkaline alcoholysis are color precursors and that color formation is intensified during alcoholysis by reaction through the unsaturated bonds.

Since the problem of color formation in polyvinyl alcohol is well known in the art, many attempts have been made to prepare polyvinyl alcohol which is color free and which will remain color free when utilized in many applications. The various suggestions which have been made to improve the color properties of polyvinyl alcohol generally fall into one of the following categories: pretreating the polyvinyl ester prior to alcoholysis; treatment of the polyvinyl alcohol after alcoholysis; or treatment of the polyvinyl ester as it undergoes alcoholysis.

U.S. Pat. No. 2,850,489, for example, describes a process for producing polyvinyl alcohol in which an alcoholic solution of a polyvinyl ester is pretreated with a small amount of a strong acid, such as sulfuric acid, prior to the alkaline catalyzed alcoholysis of the polyvinyl ester to produce polyvinyl alcohol having much less color and improved thermal stability than is the case without acid pretreatment. British patent 808,108 teaches that the development of yellow color in polyvinyl alcohol may be substantially prevented by having an additive present during the alcoholysis reaction which will react with aldehydes produced during the reaction which are thought to be responsible for the color formation. The aldehyde-reactive additives described in the British patent include hydrazine, hydroxylamine, sodium borohydride, and peroxides. While these prior art treatments of polyvinyl alcohol have been efficient color removers, they suffer from the disadvantage that color will usually reappear should the pH of the polyvinyl alcohol become alkaline.

It is the principal object of this invention to provide a process for producing polyvinyl alcohol having improved color properties, that is, substantially color free polyvinyl alcohol. A further object of this invention is to provide substantially color free polyvinyl alcohol solutions which remain color free at pH values of 7 or higher. Likewise, it is an object of this invention to provide substantially color free polyvinyl alcohol which can be converted into compounds such as substantially color free polyvinyl butyral. These and other objects will be apparent as the invention is described.

SUMMARY OF THE INVENTION

The method of the present invention comprises, in the preparation of polyvinyl alcohol by the alkali metal alcoholate-catalyzed alkaline alcoholysis of an alcoholic solution of a polyvinyl ester, the improvement comprising pretreating an alcoholic solution of the polyvinyl ester with ozone, continuing the pretreating with ozone until the polyvinyl ester contains from about 300 parts per million (ppm) to about 3000 ppm of ozone per 100 grams of polyvinyl ester, and then alcoholyzing the pretreated polyvinyl ester.

DETAILED DESCRIPTION OF THE INVENTION

The ozone pretreatment of the polyvinyl ester is accomplished by passing a stream of gas, especially oxygen or air, containing from about 0.1 to about 2 percent, by weight, preferably about 1 percent, ozone through the polyvinyl ester solution. The ozone may be generated by the passage of oxygen or air, preferably the latter, through a Welsbach ozone generator. The oxygen or air containing ozone is passed through the polyvinyl ester solution for from about 15 to about 30 minutes until the polyvinyl ester solution contains from about 300 to about 3,000 ppm of ozone per 100 grams of polyvinyl ester. In a preferred embodiment of the invention, the polyvinyl ester solution contains from about 600 ppm to about 1,000 ppm of ozone per 100 grams of polyvinyl ester.

The ozone pretreatment of the polyvinyl ester is accomplished at a temperature ranging from about 20° C. to about 150° C., preferably from about 45° C. to about 100° C. While the pressure conditions employed may be sub-atmospheric or superatmospheric, especially at the higher temperatures, atmospheric pressure conditions are preferred.

The polyvinyl ester utilized in this invention may be derived from a carboxylic acid containing one to four carbon atoms such as formic, acetic, propionic or butyric acid. The polyvinyl ester, e.g. polyvinyl acetate, is treated in the form of an alcoholic solution in which the polyvinyl ester is present in a concentration of from about 20 percent to about 60 percent, preferably from about 30 percent to about 50 percent, by weight, based on the combined weights of the polyvinyl ester and alcohol solvents. Suitable alcohols for the solution of the polyvinyl ester include the monohydroxy saturated aliphatic alcohols containing from one to four carbon atoms such as methanol, ethanol, etc., preferably methanol. After the polyvinyl ester alcoholic solution has been subjected to ozone pretreatment, the alcoholysis reaction may proceed. In general, the process followed is that described in U.S. Pat. No. 2,734,048.

Alcoholysis is accomplished with a hydrolytic alcohol selected from the group consisting of methanol, ethanol, the mono-methyl ether of ethylene glycol and the mono-ethyl ether of ethylene glycol. Methanol is the preferred hydrolytic alcohol. Preferably from about one to about three parts, by weight, of methanol are employed for each part, by weight, of the polyvinyl ester reacted.

The alcoholysis reaction is aided by the presence of an anhydrous alkali metal alcoholate catalyst derived from an alkanol containing from one to about 10 carbon atoms. The preferred catalyst is sodium methylate. The catalyst preferably is added in the form of a solution in anhydrous alcohol, preferably made by reacting an alkali metal, such as sodium, with an excess of an anhydrous alcohol, e.g. methanol. Any alkali metal alcoholate may be used as a catalyst, e.g. potassium ethylate, lithium butylate, sodium propylate, sodium butylate, sodium decylate and the like. The catalyst is utilized in a concentration of from about 0.1 percent to about 5 percent, by weight, based on the weight of the reaction mixture. Preferably from about 0.2 percent to about 0.5 percent, by weight, of sodium methylate is a satisfactory catalyst.

The alcoholysis reaction may be carried out at a temperature varying from about 20° C. to about 150° C., preferably from about 40° C. to about 100° C. While the pressure conditions employed may be sub-atmospheric or superatmospheric, especially at the higher temperatures, atmospheric pressure conditions are preferred.

The alcoholysis reaction is preferably carried out in an apparatus consisting of multiple reaction vessels connected in series such that the effluent from the first reaction vessel flows into the second reaction vessel and the effluent from the latter is treated to recover the polyvinyl alcohol therefrom. Such an apparatus is defined with more specificity in U.S. Pat. No. 2,734,048.

The polyvinyl alcohol produced by this process has improved color properties, that is, it is substantially color free and does not develop color when subjected to either alkaline or acid treatments. By substantially color free polyvinyl alcohol is meant polyvinyl alcohol having a color value, expressed as "percent yellow," no higher than about 5 percent, as determined with a Coleman Junior Spectrophotometer as a 4 percent solution of the polyvinyl alcohol in distilled water according to the method described hereinafter in Example 1.

In addition, the treatment with ozone has no adverse effects on the other desirable qualities of polyvinyl alcohol, that is, the stability, for example, of the polyvinyl alcohol is not affected by the treatment of the polyvinyl ester with ozone. In this regard, ozone is unique among oxidizing agents, particularly the peroxides, since the presence of ozone in the polyvinyl ester during the alcoholysis reaction does not cause degradation of the resultant polyvinyl alcohol. The film forming properties, rate of solution, and the temperature required for solution of the polyvinyl alcohol in water are also in no way adversely affected by the treatment with ozone.

This invention may be more fully explained from a consideration of the following examples which are not to be considered as limiting the scope of this invention.

EXAMPLE 1

Three thousand grams of a solution of polyvinyl acetate (45 percent) in methanol (55 percent) is placed in a resin kettle equipped with a stainless steel agitator, reflux condenser and a submerged tube which reaches to the tip of the agitator. This assembly is placed in a water bath at 60° C. A stream of air containing 1 percent ozone is passed through the submerged tube at the rate of 50 cc (volume) per minute for 30 minutes with agitation.

Six hundred and fifty ml of methanol and 40 grams of sodium methylate are added to a glass reactor, fitted with a stainless steel agitator and reflux condenser contained in a water bath heated to 60°–65° C. When the sodium methylate is completely dissolved in the methanol, the ozone-treated polyvinyl acetate solution is continuously added with agitation, at a rate of approximately 10 to 15 grams per minute over an interval of 300 minutes. After completion of the polyvinyl acetate addition, agitation and heating are continued for 30 minutes. Then the contents of the charge are neutralized by the addition of 60 grams of glacial acetic acid. The contents of the neutralized reactor are filtered through a Buchner funnel and washed with a volume of methanol equal to the volume of the original filtrate. The Buchner funnel with filter cake is covered with filter paper, placed in an oven at 40° to 50° C. and dried with vacuum from a water aspirator for approximately 12 hours. The polyvinyl alcohol produced is relatively color free and is color stable at both alkaline and acid pH. The color of the polyvinyl alcohol is determined on the basis of the percent yellow which can be measured with a standard laboratory instrument such as a Coleman Junior Spectrophotometer. For example, an aliquot of the dry product was dissolved in distilled water at 90°–95° C. to form a 4 percent solution. The color of the 4 percent solution at 25° C. is found to be 4.0 percent yellow.

The percent yellow is determined with a Coleman Junior Spectrophotometer by measuring the transmission (T) of light through the solution at wave lengths of 450, 560, and 640 A. and calculated by the equation:

$$\text{Percent Yellow} = \frac{(T_{640} - T_{450}) \times 100}{T_{560}}$$

As a reference, distilled water measured under the same conditions gives a value of 0 percent yellow.

EXAMPLE 2

Another sample of the same polyvinyl acetate used in Example 1 was alcoholyzed by a procedure similar to Example 1 except there was no treatment of the alcoholic solution of polyvinyl acetate with a stream of air containing 1 percent ozone. An aliquot of this dried product dissolved in distilled water as a 4 percent solution had a color of 16 percent yellow.

The polyvinyl alcohols produced by the process described in this invention are thus substantially free of undesired yellow color. These polyvinyl alcohols made by this process may be converted to polyvinyl butyrals according to the process described in U.S. Pat. No. 2,358,355 or U.S. Pat. No. 3,153,009 and then used to make substantially color-free laminated structures such as glass laminates.

What is claimed is:

1. In the preparation of a polyvinyl alcohol by the alkali metal alcoholate-catalyzed alkaline alcoholysis of an alcoholic solution of a polyvinyl ester derived from a carboxylic acid containing from one to four carbon atoms, the improvement comprising pretreating the alcoholic solution of polyvinyl ester with ozone, continuing the pretreating of the polyvinyl ester until the polyvinyl ester contains from about 300 ppm to about 3000 ppm of ozone per 100 grams of polyvinyl ester, and then alcoholyzing the pretreated polyvinyl ester.

2. The method of claim 1 wherein the polyvinyl ester contains from about 600 ppm to about 1,000 ppm of ozone per 100 grams of polyvinyl ester.

3. The method of claim 1 wherein the ozone pretreatment occurs at a temperature of from about 20° C. to about 150° C.

4. The method of claim 3 wherein the ozone pretreatment occurs at a temperature of from about 45° C. to about 100° C.

5. The method of claim 1 wherein the ozone is in oxygen or air at a concentration of from about 0.1 percent to about 2 percent, by weight.

6. The method of claim 5 wherein the ozone is in air at a concentration of about 1 percent, by weight.

7. Polyvinyl alcohol prepared according to claim 1.

* * * * *